Dec. 31, 1957   R. PHILLIPS   2,818,143
BRAKE ADJUSTMENT MECHANISM
Filed Oct. 1, 1954   2 Sheets-Sheet 1

INVENTOR.
ROY PHILLIPS
BY Hudson, Brighton,
Williams, David & Hoffmann
ATTORNEYS

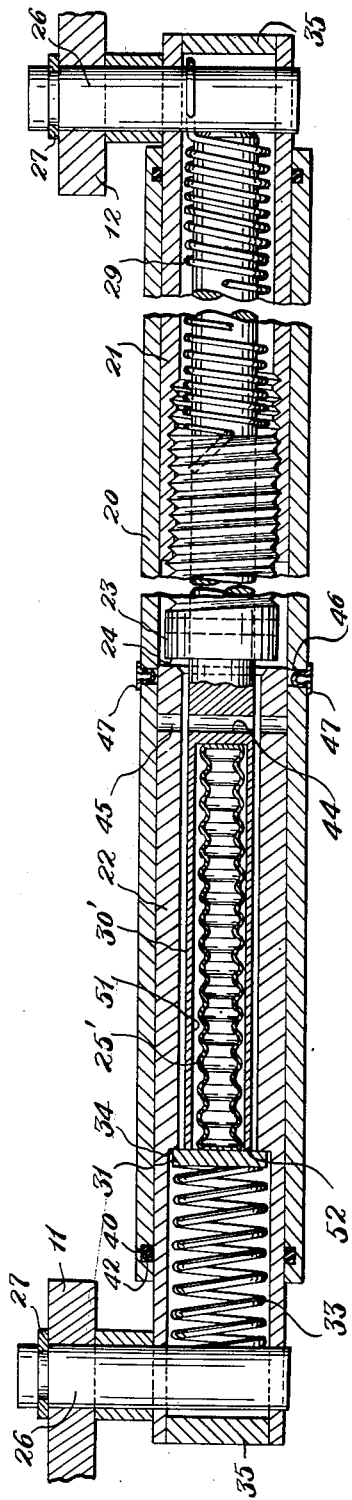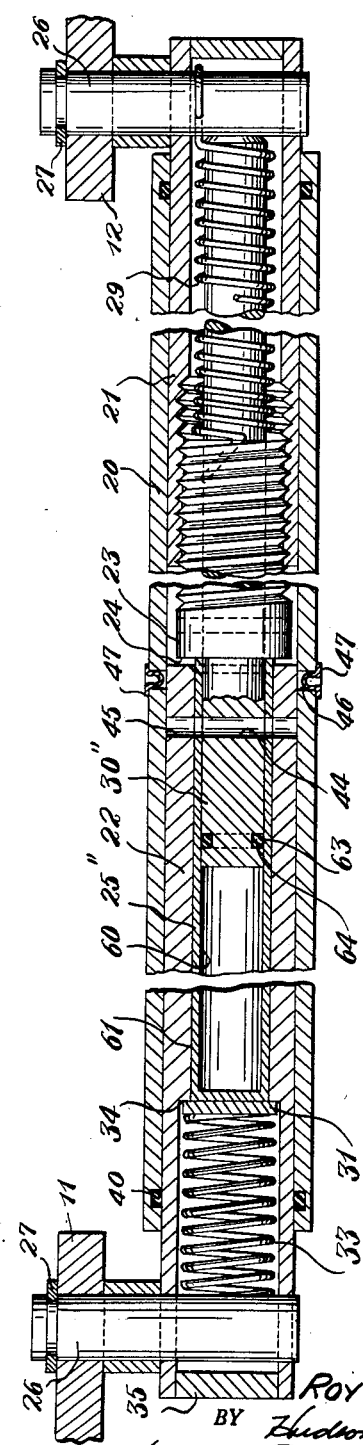

United States Patent Office 2,818,143
Patented Dec. 31, 1957

2,818,143

BRAKE ADJUSTMENT MECHANISM

Roy Phillips, Chagrin Falls, Ohio

Application October 1, 1954, Serial No. 459,708

12 Claims. (Cl. 188—196)

The present invention relates to clearance adjusting devices, especially automatic brake clearance adjusting devices, and, more particularly, to an automatic brake clearance adjusting device of the type adapted to automatically provide a predetermined clearance between a retracted brake shoe and a brake drum which device contains automatic means for preventing the device from adjusting itself in response to an increase in clearance between the brake shoe and the brake drum produced as a result of thermal expansion of the brake drum.

An object of the present invention is the provision of a new and improved clearance adjusting device having means which prevents the device from operating to adjust clearance between two spaced members at temperatures above a predetermined level.

Another object of the present invention is the provision of a new and improved automatic brake clearance adjusting device which device contains automatic means for preventing the device from operating to change the clearance between a brake drum and a retracted brake shoe when the brake drum or the interim thereof is at temperatures above a predetermined level.

A still further object of the invention is the provision of a new and improved automatic clearance adjusting device of the type comprising first and second members at least one of which is suitably supported for movement toward and away from the other member, a third member movably supported on said first member and adapted to limit movement of said second member toward said first member, means for advancing said third member toward said second member whenever the second member is more than a predetermined distance from said third member, and temperature responsive means rendering said first-mentioned means inoperative at temperatures above a predetermined temperature.

The further objects and advantages of the invention will be apparent to those skilled in the art to which the invention relates from the description of the following embodiments described with reference to the accompanying drawings forming a part of this specification, in which similar reference characters designate corresponding parts, and in which:

Fig. 6 is a longitudinal sectional view similar to Fig. 3 but embodying a bellows type of thermostatic unit, and Fig. 7 is a view similar to Fig. 6 but embodying an air-filled expansion chamber.

While the present invention is applicable to various types of clearance adjusting devices, it is herein shown as embodied in a device for automatically adjusting the retracted positions of the brakes of an automotive vehicle. According to the provisions of the present invention, the device includes temperature responsive or thermostatic means for preventing the device from automatically compensating for changes in clearance between members, which clearance the device is adapted to control, when these changes are produced as a result of thermal expansion. The temperature responsive or thermostatic means utilized to control the operation of the clearance adjusting device may be any one of a number of types, for example, bimetallic elements and bellows and other type expansion units or chambers of various kinds, including gas or liquid filled, or containing a low boiling point liquid, that is, vapor filled, and the detailed application of several will be hereinafter described.

Figure 1:
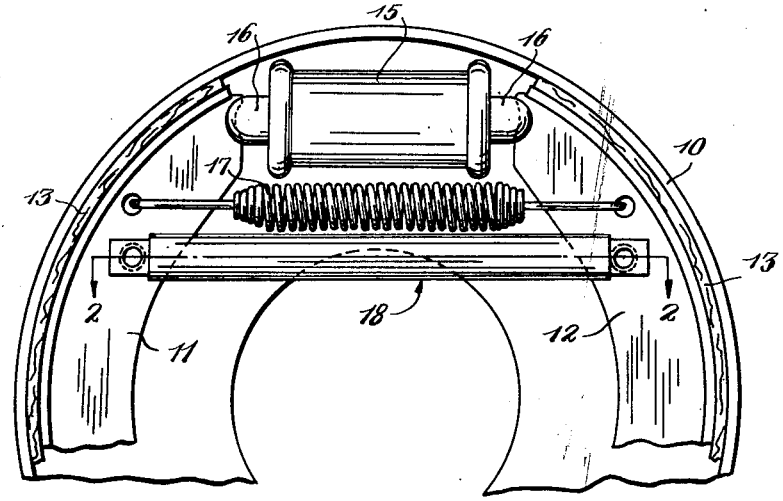
Fig. 1 is a fragmentary elevational view of a hydraulic friction brake embodying the present invention.

The embodiment of the invention shown in Figs. 1 through 5 of the drawings uses a bimetallic element type of thermostatic means. The brake shown comprises a brake drum 10, brake shoes 11, 12 provided with brake linings 13. The brake shoes are pivotally mounted at a point, not shown, for movement to braking position by a hydraulic cylinder 15 located intermediate the upper, adjacent, spaced ends of the brake shoes. When pressure is applied to the cylinder, hydraulic plungers 16 engaging the upper ends of the shoes move outwardly to expand the shoes and press the lining 13 into engagement with the brake drum, as shown in Fig. 1. A retracting spring 17 connected to the brake shoes adjacent to the brake cylinder pulls the brake shoes back into their nonbraking position when the pressure is removed from the hydraulic cylinder 15.

In order for the brake to function satisfactorily, it is desirable to have and maintain a predetermined clearance between the brake drum and the brake lining when the brake is in its nonbraking position. The clearance, however, between the lining and the drum will become greater as the brake is used due to the wear of the lining. The adjusting mechanism or device, designated generally as 18, automatically maintains a predetermined clearance between the lining and the brake drum as wear occurs, by determining the point to which the spring 17 returns the brake shoes 11, 12. The device is preferably constructed as a unit that may be quickly and easily attached to a conventional friction brake and is so shown in the drawings.

Figure 2:
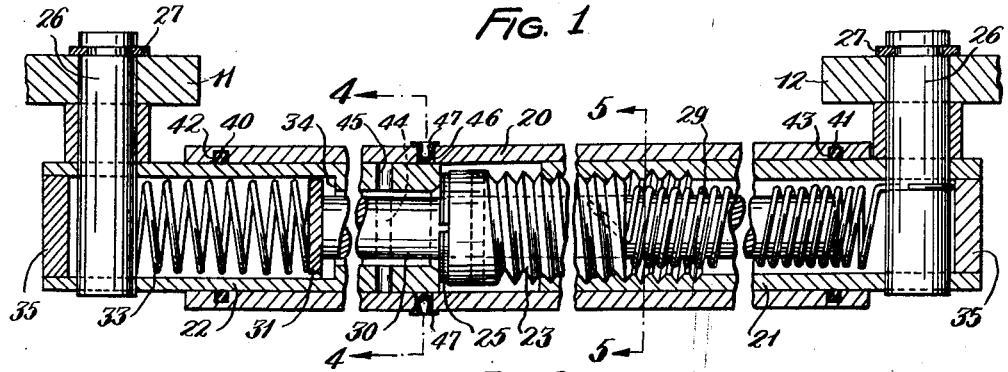
Fig. 2 is an enlarged sectional view taken along line 2—2 of Fig. 1 and showing the brake adjusting mechanism in the nonbraking or retracted position.

The adjusting device 18 comprises a tube or sleeve 20 having slidably supported therein coaxial members 21, 22 positioned in end-to-end relationship with their outer ends connected to the shoes 12, 11, respectively. The minimum spacing between the members 21, 22 is controlled by a spacing or abutment member 23 threaded into member 21 and provided with a shoulder 24 on a part projecting therefrom adapted to abut and compress a bimetallic element 25, the operation of which will later be described, between itself and the inner end of member 22. The spring 17, in absence of overriding pressure in cylinder 15, will move the upper ends of the brake shoes 11, 12 toward each other until the member 22 completely collapses the bimetallic element 25 between itself and the shoulder 24 on the member 23, as shown in Fig. 2, thereby preventing further inward movement. The effective length of the members 21, 22 and the spacing member 23 determines the distance between the outer ends of the members 21, 22 when the brake is in its nonbraking position, and consequently the brake clearance. The members 21, 22 fit closely within the tube 20 but are freely slidable therein and the ends thereof projecting beyond the opposite ends of the tube 20 are provided with mounting pins 26 adapted to be inserted into drilled apertures in the brake shoes and secured therein by snap rings 27.

Figure 3:
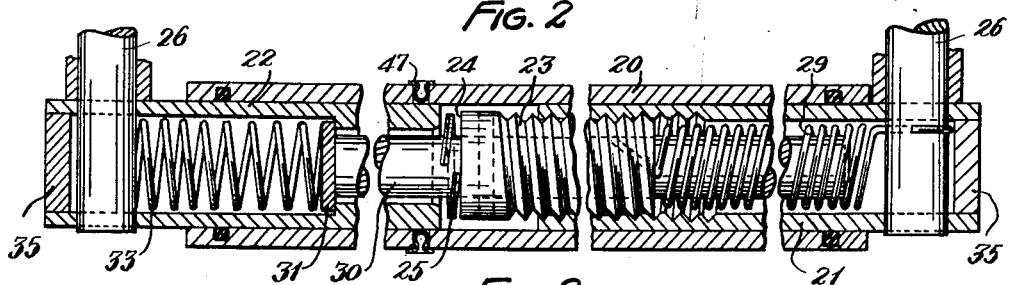
Fig. 3 is a view similar to Fig. 2 but showing the adjusting mechanism in the braking position.
Figures 4, 5:
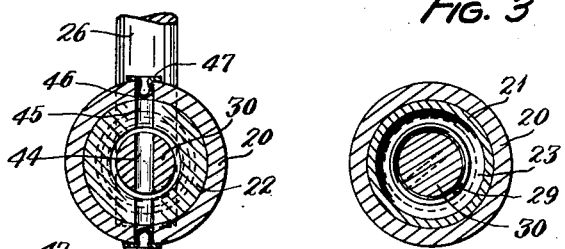
Fig. 4 is a sectional view taken approximately on the line 4—4 of Fig. 2.
Fig. 5 is a sectional view taken approximately along the line 5—5 of Fig. 2.

When pressure is applied to the cylinder 15 to move the brake shoes to their braking position, the member 22 and the shoulder 24 on the member 23 will be moved apart, see Fig. 3. The free distance or space between the member 22 and the shoulder 24 i. e. the distance between member 22 and shoulder 24 less the compressed thickness of the bimetallic element 25 when the shoes are in their braking position, will be a function of the clearance between the brake shoes or linings and the brake drum when the brake shoes are in the nonbraking position, in which position the bimetallic element 25 is collapsed between the member 22 and the shoulder 24 on the member 23.

As wear occurs, the clearance between the lining and the drum, and the free space between member 22 and the shoulder 24 on the member 23 tends to increase. The free space between member 22 and the shoulder 24 of the member 23 when in braking position and, in turn, the brake clearance are maintained constant by the turning or threading of the member 23 toward the member 22 to compensate for wear as it occurs. To this end, a torsion spring 29 within the member 21 is interposed between the member 23 and the right-hand pin 26. The spring 29 tends to rotate the member 23 so that it will be threaded outwardly of member 21 toward member 22. The rotation, however, of member 23 is prevented when the brake clearance is as desired by the engagement of the end of a rod 30 pinned or otherwise fixed to the member 23 with a disk-like member 31 located within and positioned transversely of the counterbored, left-hand end of the member 22. The rod 30 may, as in the illustrated embodiment, extend through the member 23 into member 21 and function as a guide rod for spring 29.

The member 31 is biased in a direction towards the end of rod 30 by a compression spring 33 within the member 22 intermediate the disk 31 and the left-hand pin 26. When the member 22 and the member 23 are moved apart, the rod 30 will be withdrawn, in part, from the member 22. The disk 31 will follow and maintain engagement with the rod 30 until it strikes the shoulder 34 at the bottom of the counterbore in the member 22 within which it is located. At this point, if the relative movement between member 23 and member 22 is continued, as is the case when wear occurs, the rod 30 will tend to lose contact with the disk 31 but will be prevented from so doing by the spring 29 which will thread the member 23 outwardly of member 21 to maintain engagement between the end of the rod 30 and the disk 31. A predetermined maximum free distance is, therefore, always maintained between the end or shoulder 24 of the member 23 and the member 22, which distance is equal to the length of that portion of the rod 30 extending beyond the shoulder 34 when the member 22 and member 23 are in abutting or nonbraking relationship. By proportioning the parts so that the rod 30 extends a distance beyond the shoulder 34, which is proportioned to the desired brake clearance when the member 22 and member 23 are in their abutting or nonbraking position, as is shown in Fig. 2, the proper brake clearance will be maintained as wear occurs by the automatic threading of member 23 outwardly to increase the spacing between members 21, 22.

Upon prolonged application of the brake sufficient heat may be developed to expand the drum 10, in which event the brake shoes move outwardly accordingly. As the brake shoes move outwardly, the effective length of the members 21, 22 and the member 23 increases except for the imposition of the bimetallic element 25. As will be hereinafter explained, the member 23 would thread outwardly of the member 21, as previously explained, to take up the additional clearance with the result that when the brakes are released, the brake shoes 11, 12 would not return to their original position but to a slightly more expanded position. The predetermined clearance between the brake shoes and the brake drum would thus be maintained but upon cooling of the brake drum it would retract, reducing the clearance between it and the brake shoes and possibly eliminating the clearance altogether, in which event the brakes would be set or would bind. The heat produced by the application of the brakes and which causes the brake drum to expand may also produce a certain amount of expansion of the members 21, 22 and the member 23, but under normal circumstances the temperature of these parts would not rise in proportion to the temperature of the brake drum, with the result that the normal expansion and contraction thereof would not equal that of the brake drum.

According to the provisions of the present invention, temporary expansion of the brake drum due to heat created therein by prolonged application of the brakes is prevented from effecting the normal clearance desired and maintained between the brake shoes 11 and 12 and brake drum 10 by the incorporation or imposition of temperature responsive means in the abutment means which normally hold the member 23 against rotation by the spring 29, which temperature responsive means in the present embodiment comprises the bimetallic element or member 25, previously referred to, interposed between the right-hand end of the member 22 and the abutment 24. The heat responsive bimetallic element 25 may be of any desired construction. As shown, it comprises a single coil of an annularly-shaped coil spring and assumes the appearance of a conventional, spring-type lock washer. The element is comparatively yieldable so that it can be collapsed by the spring 17 which biases the brake shoes. The bimetallic element 25 however, is of sufficient strength as compared to spring 29 that it can prevent spring 29 from advancing the member 23 when the opposite ends of the bimetallic element are contacted by shoulder 24 and member 22. Bimetallic element 25 is preferably designed to assume an expanded width at a predetermined normal temperature such that it will bridge the normal space between shoulder 24 and member 22 when shoulder 24 and member 22 are in their retracted positions in which event the member 31 and the spring 33 may be dispensed with. Upon a rise in temperature incident to prolonged application of the brakes, the temperature within the brake drum will rise as well as the temperature of the brake drum itself and the bimetallic element 25 is so designed that it will expand an amount equal to, or exceeding, the amount which the brake drum expands, thereby remaining in contact with shoulder 24 and member 22 and constituting abutment means supplementing the abutment formed by the parts 30, 31 and preventing the advancement of member 23. When the temperature of the device returns to normal, the bimetallic element 25 may collapse until it no longer bridges the normal or desired space between shoulder 24 and member 22 when the brakes are in their retracted position, and upon the next application of the brakes, the disk 31 again controls the advancement of member 23.

A second embodiment of the invention is shown in Fig. 6 wherein the duplicate parts are designated by the same reference characters previously employed and the corresponding but differently constructed parts by the same reference characters with a prime mark affixed thereto. In the embodiment shown in Fig. 6 of the drawing a bellows type, vapor filled temperature responsive or thermostatic unit 25' having a low temperature boiling point liquid therein is used instead of the previously described bimetallic element 25. The bellows unit 25' may be any one of the previously described types and is shown as a bellows type vapor pressure unit positioned in a longitudinally extending chamber or bore 51 in the end of the rod 30' in a manner permitting one end of the bellows to expand outwardly against the disc 31.

The operation of this embodiment is quite similar to that of the preceding embodiment. The unit is shown in its normal brake-applying position, with the members 21 and 22 in their expanded positions. Upon release of the brakes, member 22 is moved into engagement with shoulder 24 on the end of member 23 providing brake clearance proportional to the clearance between the members shown in the drawing. Upon a rise in temperature incident to prolonged application of the brakes, bellows 25' expands outwardly beyond the end 52 of the member 30' against disk 31 and prevents member 23 from being advanced toward the disk 31 by the spring 29 even though wear has occurred. After the brakes are released and the temperature becomes normal or slightly below normal, the end of the bellows will contract inwardly from the end 52 of the member 30' and out of engagement with disk 31. Upon the next application of the brakes, in the event wear has occurred in the interim, members 21 and 22 will be moved farther apart than they had previously been and the end of rod 30' will no longer engage disk 31, whereupon spring 29 is free to advance rod 30' until it again engages the disk.

A third embodiment of the invention is shown in Fig. 7 in which parts which are a duplicate of those shown in the previous embodiments are designated by the same reference character and the corresponding but differently constructed parts are designated by the same reference numeral but with a double prime mark affixed thereto. The temperature responsive element 25" in this embodiment comprises a vapor-filled piston chamber 60 formed by the telescoping of the open end of a tubular, cup-shaped cylinder 61 over the end of rod 30". Cylinder 61 has a length exceeding the distance between the end of member 22 and the bottom of the counterbore 34 by an amount proportional to the braking clearance desired and an O-ring 63 seated in a groove 64 on the end of the rod 30" provides sealing engagement between the rod and cylinder. In the normal brake-applying position shown in the drawing, the projecting end of cylinder 61 bears against plate 31 with sufficient pressure to hold the other end of the cylinder in engagement with abutment 24. Should wear occur, a subsequent application of the brakes causes surface 34 of member 22 to lift plate 31 from the end of cylinder 61 and permits spring 29 to advance members 23 until the projecting end of the cylinder again abuts the plate. Upon a rise in temperature in this embodiment, an increase in vapor pressure in chamber 60 causes the cylinder 61 to compress spring 33 and hold plate 31 out of engagement with surface 34. This prevents spring 29 from advancing member 23 until such time as the temperature falls to or below normal. If wear has occurred, the next application of the brakes will cause plate 31 to be moved from the end of the cylinder 61 and member 23 will be advanced in a manner similar to that of previous embodiments.

It will be noted from the drawings that the tube 20 and the members 21, 22 are of maximum length consistent with the space limitations imposed by the size of the brake, thereby providing long, overlapping, sliding connections which permit free operation of the various parts and prevent any sagging and binding. The members 21, 22 float, so to speak, within the tube 20 and no binding forces or stresses are imposed upon the threaded connection between the member 21 and the member 23 other than those required to perform the desired operation. The projecting ends of members 21 and 22 are closed by plugs 35 to assure that the operating parts will remain free from dust and dirt. To aid in this regard, O-ring or other type seals may be positioned between tube 20 and members 21 and 22. This may preferably be accomplished by means of O-rings 40 and 41 positioned in annular grooves 42 and 43, respectively, in the outer ends of the tube 20.

If the adjusting mechanism, when installed, is adjusted so that the shoes have a greater clearance in their non-braking position than that desired, the member 23 will be threaded outwardly the first time the brakes are applied to automatically adjust the effective length of members 21, 22 and member 23 and thereafter the lining on the shoes will have the desired proper clearance with respect to the brake drum when returned to their non-braking position.

The adjusting mechanism may be assembled and shipped with a wire inserted through holes 44, 45 and 46 in parts 30, 22 and 20, respectively, and looped around, or otherwise inserted through a second set of holes, not shown, extending through parts 20, 21 and 23, keeping the parts positioned together such that the effective length of the device is a minimum. When the device is to be installed, the brake shoes are moved to their full retracted positions and the wire or position of the wire inserted through holes in parts 20, 21 and 23 is removed and member 21 is screwed out until the center-to-center distance of pins 26 corresponds to the distance between the receiving apertures in the brake shoes 11 and 12. Pins 26 are inserted into their receiving apertures and are locked in place by the insertion of the snap rings 27. Thereafter the remaining portion of the wire is removed from holes 44, 45 and 46 and rubber plugs 47 are installed in all four holes in the tube 20 to seal out water and dirt. The device will automatically adjust itself as previously described and is ready for use.

While the members 21, 22 have been described as both being slidably mounted in the tube 20, the invention will function satisfactorily if one of the members 21, 22 is fixed with respect to, or formed integral with tube 20, and the other slidable so long as a long, well overlapping, sliding connection is maintained, thereby avoiding any sagging, etc. of the parts which might tend to interfere with their free and easy operation.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

Having thus described my invention, I claim:

1. A brake adjusting device comprising a sleeve, a first and second member supported in said sleeve at opposite ends thereof and at least one of which is slidingly supported by said sleeve, a third member threaded into said first member and extending toward said second member, one of said second and third members being provided with an enlarged axially extending counterbore having an end surface spaced apart from the end of said member facing said other member and having an axially extending hole of smaller diameter extending between the end surface of said counterbore and said end of said member, the other of said members having an axially extending rod projecting toward the other member, a cup-shaped tubular cylinder telescoped over the end of said rod to form a fluid chamber and extending into said axially extending hole, the end of said cylinder extending into said counterbore a predetermined distance when said second and third members are in abutting engagement with each other, a fluid having a low boiling point temperature in said chamber, spring means connected between said first and third members to thread said third member relative to said first member in a direction toward said second member, a fourth member in said counterbore, and means biasing said fourth member toward said end surface of said counterbore to prevent advancement of said third member by said spring means when said fourth member engages the end of said cylinder.

2. In a brake clearance adjusting device, first and second members supported for relative reciprocable movement toward and from each other, a third member adjustably connected to said first member for movement toward said second member, said second and third members having fixed abutments thereon limiting said relative reciprocable movement therebetween in the direction toward each other, means operatively connected to said first and third members biasing said third member for movement relative to said first member in a direction to effect said adjustment, and means including temperature responsive means operatively associated with said second and third members and responsive to said relative reciprocable movement of said first and second members and to temperature changes for selectively holding said third member against movement relative to said first member by said first-named means.

3. A brake clearance adjusting device as claimed in claim 2 wherein said temperature responsive means comprises a bimetallic member.

4. A brake clearance adjusting device as claimed in claim 2 wherein said temperature responsive means comprises a bellows-type container having a low temperature boiling point liquid therein.

5. A brake clearance adjusting device as claimed in claim 2 wherein said temperature responsive means comprises a telescoped member closed at opposite ends and having a low temperature boiling point liquid therein.

6. In a brake clearance adjusting device, first and second members supported for relative reciprocable movement toward and from each other, a third member threaded to said first member for adjustment toward said second member, said second and third members having fixed abutments thereon limiting said relative reciprocable movement therebetween in the direction toward each other, spring means operatively connected to said first and third members biasing said third member for rotation relative to said first member in a direction to effect said adjustment, and abutment means including temperature responsive means operatively associated with said second and third members and responsive to said relative reciprocable movement of said first and second members and to temperature changes for selectively holding said third member against rotation by said spring means relative to said first member.

7. A brake clearance adjusting device as claimed in claim 6 wherein said temperature responsive means comprises a bimetallic member.

8. A brake clearance adjusting device as claimed in claim 6 wherein said temperature responsive means comprises a bellows-type container having a low temperature boiling point liquid therein.

9. A brake clearance adjusting device as claimed in claim 6 wherein said temperature responsive means comprises a telescoped member closed at opposite ends and having a low temperature boiling point liquid therein.

10. A brake adjusting device comprising a sleeve, a first and a second member connected by said sleeve for relative reciprocable movement toward and from each other, a third member threaded into said first member and projecting therefrom toward said second member, means on said second and third members limiting relative movement therebetween in the direction toward each other, spring means connected between said first and third members biasing said third member for rotation relative to said first member in a direction to move said third member toward said second member, one of said second and third members being provided with an enlarged axially extending counterbore having an end surface spaced from the end of said member facing said other member and having an axially extending aperture of smaller diameter extending between said end surface of said counterbore and said end of said member, the other of said members having a projection extending into said aperture and comprising abutment means extending into said counterbore a predetermined distance when said second and third members are at the limit of their movement toward each other, a fourth member reciprocable in said counterbore, means biasing said fourth member toward said end surface of said counterbore and into engagement with said abutment means for holding said third member against rotation by said spring means relative to said first member while said abutment means projects into said counterbore, and means in said projection including means responsive to a raise in temperature for moving said abutment means relative to said member of which it is a part in the direction of said fourth member.

11. A brake clearance adjusting device as claimed in claim 10 wherein the means responsive to a rise in temperature is a low temperature boiling point liquid within a bellows-type container.

12. A brake clearance adjusting device as claimed in claim 10 wherein the means resopnsive to a rise in temperature is a telescoped member closed at opposite ends and a low temperature boiling point liquid within a chamber formed by two telescoped tubular members having their opposite ends closed.

References Cited in the file of this patent

UNITED STATES PATENTS

| | | |
|---|---|---|
| 951,577 | Price | Mar. 8, 1910 |
| 2,240,792 | Liebreich | May 6, 1941 |